(12) United States Patent
Maher, III et al.

(10) Patent No.: US 8,090,845 B2
(45) Date of Patent: Jan. 3, 2012

(54) APPARATUS AND METHOD FOR FIREWALL TRAVERSAL

(75) Inventors: Robert Daniel Maher, III, Plano, TX (US); Aswinkumar Vishanji Rana, Plano, TX (US); Milton Andre Lie, McKinney, TX (US); James Robert Deerman, Lucas, TX (US)

(73) Assignee: Audiocodes Texas, Inc., Plano, TX (US)

( * ) Notice: Subject to any disclaimer, the term of this patent is extended or adjusted under 35 U.S.C. 154(b) by 2207 days.

(21) Appl. No.: 10/967,470

(22) Filed: Oct. 18, 2004

(65) Prior Publication Data

US 2006/0085548 A1    Apr. 20, 2006

(51) Int. Cl.
*G06F 15/16* (2006.01)

(52) U.S. Cl. ............................................. 709/228

(58) Field of Classification Search ............... 726/11; 709/229, 228
See application file for complete search history.

(56) References Cited

U.S. PATENT DOCUMENTS

| | | | |
|---|---|---|---|
| 7,436,848 B1 * | 10/2008 | Lewis et al. ................ | 370/462 |
| 7,483,437 B1 * | 1/2009 | Mohaban ..................... | 370/400 |
| 7,694,127 B2 * | 4/2010 | Adams et al. ................ | 713/151 |
| 2004/0015721 A1 * | 1/2004 | Eastlake, III ................ | 713/201 |
| 2004/0034793 A1 | 2/2004 | Yuan | |
| 2004/0143671 A1 * | 7/2004 | Idnani ........................... | 709/230 |
| 2004/0162915 A1 * | 8/2004 | Caronni et al. .............. | 709/245 |
| 2004/0205212 A1 * | 10/2004 | Huotari et al. ............... | 709/230 |
| 2005/0021999 A1 * | 1/2005 | Touitou et al. .............. | 713/200 |
| 2005/0083911 A1 * | 4/2005 | Grabelsky et al. .......... | 370/352 |
| 2005/0198190 A1 * | 9/2005 | Zavalkovsky et al. ...... | 709/217 |
| 2005/0210292 A1 * | 9/2005 | Adams et al. ................ | 713/201 |
| 2006/0045068 A1 * | 3/2006 | Wu et al. ..................... | 370/352 |
| 2006/0053488 A1 * | 3/2006 | Sinclair et al. .............. | 726/22 |
| 2006/0078096 A1 * | 4/2006 | Poyhonen et al. .......... | 379/88.12 |

OTHER PUBLICATIONS

J. Rosenberg, H. Schulzrinne, RFC 3581—An Extension to to the Session Initiation Protocol (SIP), Aug. 2003, Network Working Group, dynamicsoft—Columbia University, Request for Comments: 3581.*
International Search Report and Written Opinion of the International Searching Authority mailed Apr. 28, 2006 for PCT Application No. PCT/US2005/037055, 15 pages.
Donovan, S., et al., "Session Timers in the Session Initiation Protocol (SIP)", IETF Standard-Working-Draft, Internet Engineering Task Force, Jul. 18, 2004, pp. 1-34.
Roach, A. B., et al, "Session Initiation Protocol (SIP)-Specific Event Notification", IEFT Standard-Working Draft, Internet Engineering Task Force, Jun. 2002, pp. 1-38.
Sterman, et al., "NAT Traversal in SIP", DeltaThree The IP Communications Network, 2002, pp. 1-16.

* cited by examiner

*Primary Examiner* — Chirag Patel
(74) *Attorney, Agent, or Firm* — Haynes and Boone, LLP

(57) ABSTRACT

An apparatus and method for traversing a network address translation/firewall device to maintain a registration between first and second devices separated by the firewall device are provided. In one example, the method includes intercepting a registration message from the first device to the second device. A determination is made based on a first timeout period defined by the second device as to whether it is time to renew the first device's registration. If it is time to renew the first device's registration, the registration message is forwarded to the second device. A response message that includes the first timeout period is intercepted, and the first timeout period is replaced with a second timeout period based on a binding lifetime of the firewall device before forwarding the response message to the first device.

18 Claims, 4 Drawing Sheets

APPARATUS AND METHOD FOR FIREWALL TRAVERSAL

CROSS-REFERENCE

This application is related to U.S. patent application Ser. No. 10/657,813, filed on Sep. 8, 2003, which is assigned to the same assignee as the present application and which is hereby incorporated by reference in its entirety.

BACKGROUND

Firewall, network address translation (NAT), and network address port translation (NAPT) devices, such as those used in enterprise and home networks, are generally based on a data security model that blocks requests from external sources. More specifically, data requests received from the network protected by the device (e.g., from the private side of the device) are generally serviced, but requests external to the protected network (e.g., from the public side of the device) are blocked. As valid data requests are assumed to be initiated from within the protected network and contain readily available address information, this is not a problem.

Accordingly, these devices create a barrier to certain types of requests and messages, including externally initiated requests and messages having buried address information, such as those used by some peer-to-peer communication and media applications (e.g., Voice over Internet Protocol (VoIP)). Firewall and NAT/NAPT devices may not only block VoIP connections and similar services, but may also deny service providers the ability to distribute VoIP end-to-end and prevent service providers from monitoring, upgrading, or reconfiguring equipment (e.g., IP telephones) that is positioned on the private side of such devices.

Accordingly, what is needed are an apparatus and method for addressing such issues.

DETAILED DESCRIPTION

Figure 1:
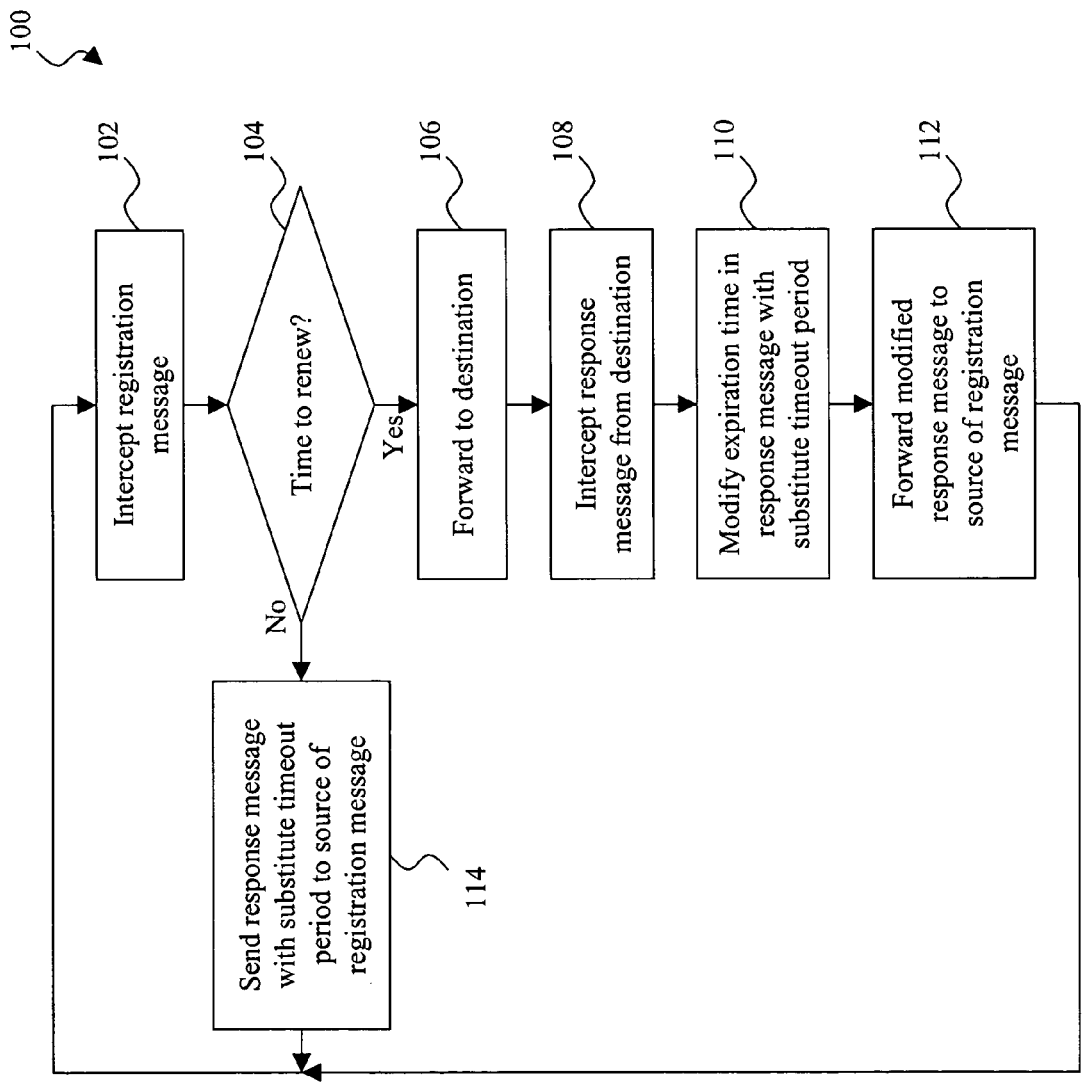
FIG. 1 is a flowchart of one embodiment of a method for traversing a firewall device.

The present disclosure relates to communications and, more particularly, to an apparatus and method for traversing a firewall. However, it is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 may be used for traversing a firewall device to maintain a registration between two devices (e.g., an IP telephone and a registrar) that are separated by the firewall device. For purposes of convenience, the term "firewall device" is used herein to include devices providing firewall functionality, as well as devices having network address translation (NAT) and/or network address port translation (NAPT) functionality. A more detailed discussion of NAT and NAPT functionality is provided in previously incorporated U.S. patent application Ser. No. 10/657,813. As will be described later in greater detail with specific examples, the method 100 may be executed by hardware and/or software contained within the firewall device, within a separate device, or distributed across multiple devices.

Although the following description refers to messaging based on the session initiation protocol (SIP), it is understood that the various embodiments may be applicable to other protocols, such as MEGACO, H.323, and MGCP. Furthermore, various media types may be used, including audio, video, and fax.

In the present example, it is understood that the IP phone has previously registered with the registrar and that the registration message (e.g., one or more packets or datagrams) is to renew or maintain an existing registration, rather than to obtain an initial registration. If the registration message is not sent within a timeout period (e.g., 3600 seconds) defined by the registrar, the IP phone's registration will expire. However, the firewall device may use a different timeout period than the registrar (e.g., 30 seconds), and may close the connection between the IP phone and registrar if the IP phone bases the frequency of its registration requests on the registrar's timeout period. This would prevent outside calls from reaching the IP phone, as no open connection would exist through which the call could pass through the firewall device. Although registration messages could be sent based on the firewall device's timeout period, the increased registration traffic may negatively impact the registrar. Accordingly, the method 100 may be used to keep the firewall device from timing out the connection and to maintain the registration of the IP phone with the registrar without flooding the registrar with registration request messages.

In step 102, a registration message sent from the IP phone to the registrar is intercepted before it is received by the registrar. The registration message may be any message used by one device to notify another device that it is still active. It is understood that the term "intercepted" simply indicates that the message is stopped prior to reaching the registrar, and that any number of devices (including the intercepting device) may be positioned between the IP phone and registrar. As such, the intercepting device may legitimately receive the message as part of the path between the IP phone and registrar.

In step 104, a determination is made as to whether it is time to renew the registration based on the timeout period established by the registrar. If it is time to renew the registration, the method 100 continues to step 106 and forwards the registration message to the registrar. (It is noted that, if the registration message was intended to establish the IP phone's initial registration with the registrar, the method may continue to step 106 but may forward the message without making any determination as to whether it is time to renew). As will be described later, various modifications may also be made to the source and/or destination addresses as the message passes from the IP phone to the registrar.

In steps 108 and 110, the registrar's response message to the registration request is intercepted and an expiration time in the response message (e.g., an expiration field) is modified from the timeout period defined by the registrar to a substitute timeout period (e.g., a timeout period less than the timeout period of the firewall device). In step 112, the modified message is forwarded to the IP phone.

Returning to step 104, if it is not time to renew the registration, the method continues to step 114, where a substitute response message that includes the substitute timeout period is sent to the IP phone. In this case, although the registration message is not forwarded to the registrar, the IP phone assumes that the substitute response message is a valid message from the registrar. Accordingly, using the method 100, one or more peer-to-peer or multimedia traffic channels may be kept open while minimizing the number of messages that need to be handled by a network. Furthermore, as described below with respect to FIG. 2, the method 100 may be implemented without requiring alterations to a customer's network equipment.

Figure 2:
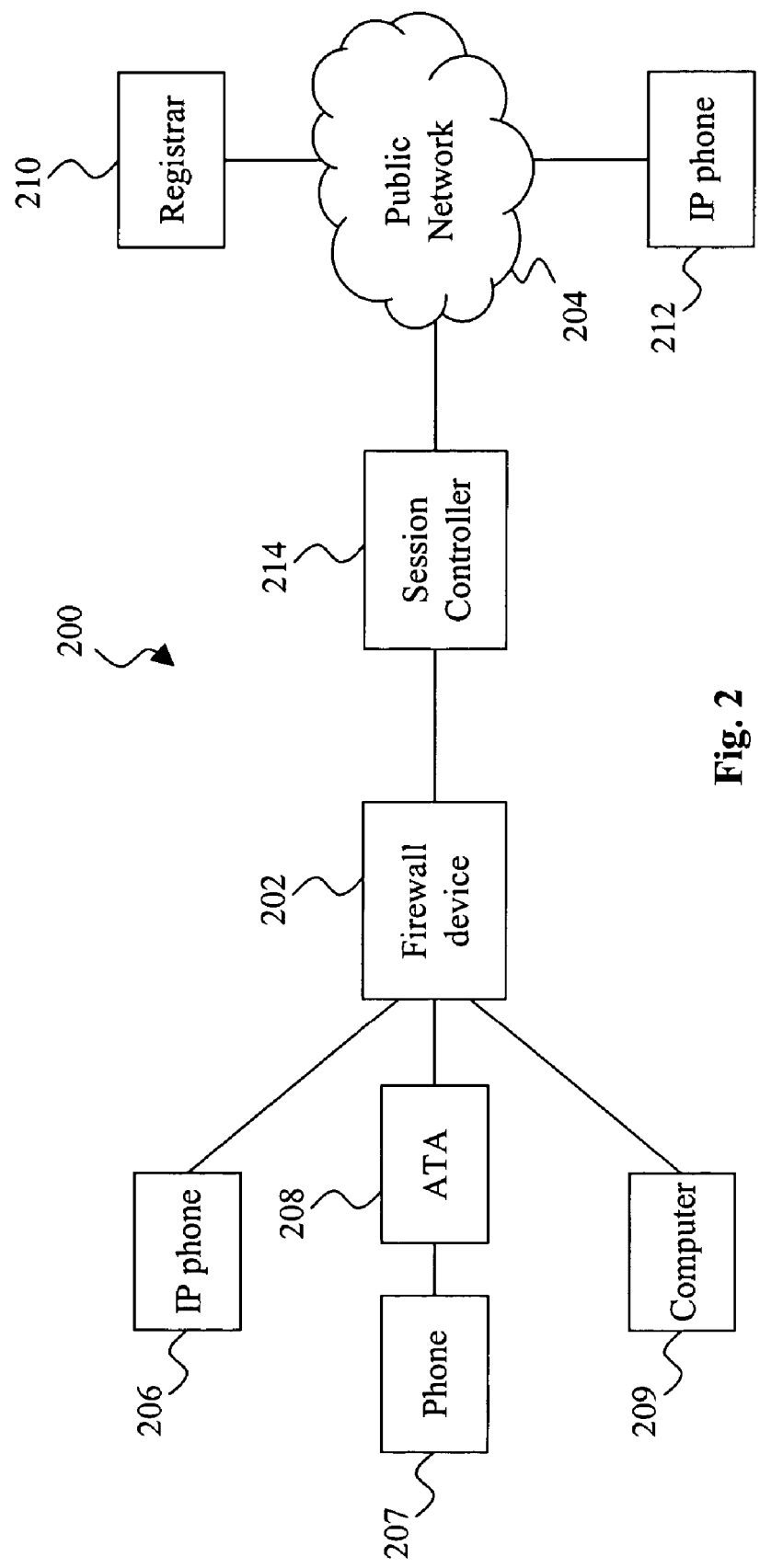
FIG. 2 is a diagram of one embodiment of a network architecture within which the method of FIG. 1 may be implemented.

Referring to FIG. 2, a network architecture 200 illustrates one embodiment of an environment within which the method 100 of FIG. 1 may be implemented. A firewall device 202 separates a private network, such as a home network, from a public network 204. For example, the firewall device 202 may be an edge device such as a cable or digital subscriber line (DSL) router having firewall, NAT, and/or NAPT capabilities. Such a router may be installed by the owner of the home network between the private and public networks to provide access to the public network 204 for various devices, such as an IP phone 206, an analog phone 207 coupled to the firewall device 202 via an analog telephone adapter (TA) 208, and a computer 209. As illustrated, the public network 204 may be coupled to various components, including a registrar 210 and an IP phone 212.

The firewall device 202 is typically configured for request/response traffic originating from the private network, but presents problems for peer-to-peer traffic such as VoIP. For example, if the firewall device 202 includes NAPT functionality, one problem involves NAPT table entries when an incoming voice call from a phone on the public side of the firewall device, such as a VoIP call from IP phone 212, is placed to the IP phone 206 on the private side of the firewall device. Usually, a table entry is created to track the source address after the firewall device 202 receives a request that originates from the private network, and the entry allows the response to the request to come back to the user. In VoIP, when the firewall device 202 receives a message from the public side of the network and compares the destination address where the request packet needs to go to against the table, there is no entry and the message will be dropped. Inbound media traffic will have the same problem.

Another problem arises with private addresses present in signaling packets, such as those used in session initiation protocol (SIP) messaging. A signaling packet that originates within the private network contains a private IP address. Routers on the public IP network are not responsible for routing packets destined for the private IP addresses of private IP networks. Additionally, the addresses for a real-time transport protocol (RTP) media stream are buried in the payload of the signaling packet. The firewall device 202 is unable to see these addresses and cannot provision itself to allow traffic from the outside phone 212. The RTP streams necessary to carry the voice call will, therefore, not be allowed through the firewall device 202.

As a solution to these problems, a session controller 214 is positioned on the public side of the firewall device 202 and serves as a proxy for outbound traffic from the private network. One example of the session controller 214 is described in greater detail in previously incorporated U.S. patent application Ser. No. 10/657,813. Although shown as a single, separate device, it is understood that functionality provided by the session controller 214 may be distributed among multiple components, and that the session controller may be removed entirely in some embodiments. As will be described below, the session controller 214 maintains an open channel to enable messages originating from the public network 204 to reach devices within the private network. For example, a call initiated by the IP phone 212 that may otherwise be blocked by the firewall device 202 may pass through the firewall device and reach the IP phone 206 due to functionality provided by the session controller 214.

Although telephone calls involving the IP phone 206 and/or TA 208 are generally used in the following examples for purposes of illustration, it is understood that the present disclosure applies equally to other types of communication and media sessions and may include the computer 209 in addition to or instead of the IP phone 206 and TA 208. Furthermore, the IP phone 206 and TA 208 may include similar functionality in terms of interaction with the firewall device 202, session controller 214, and registrar 210, and examples using one of the IP phone and TA may be equally applied to the other.

Figure 3:
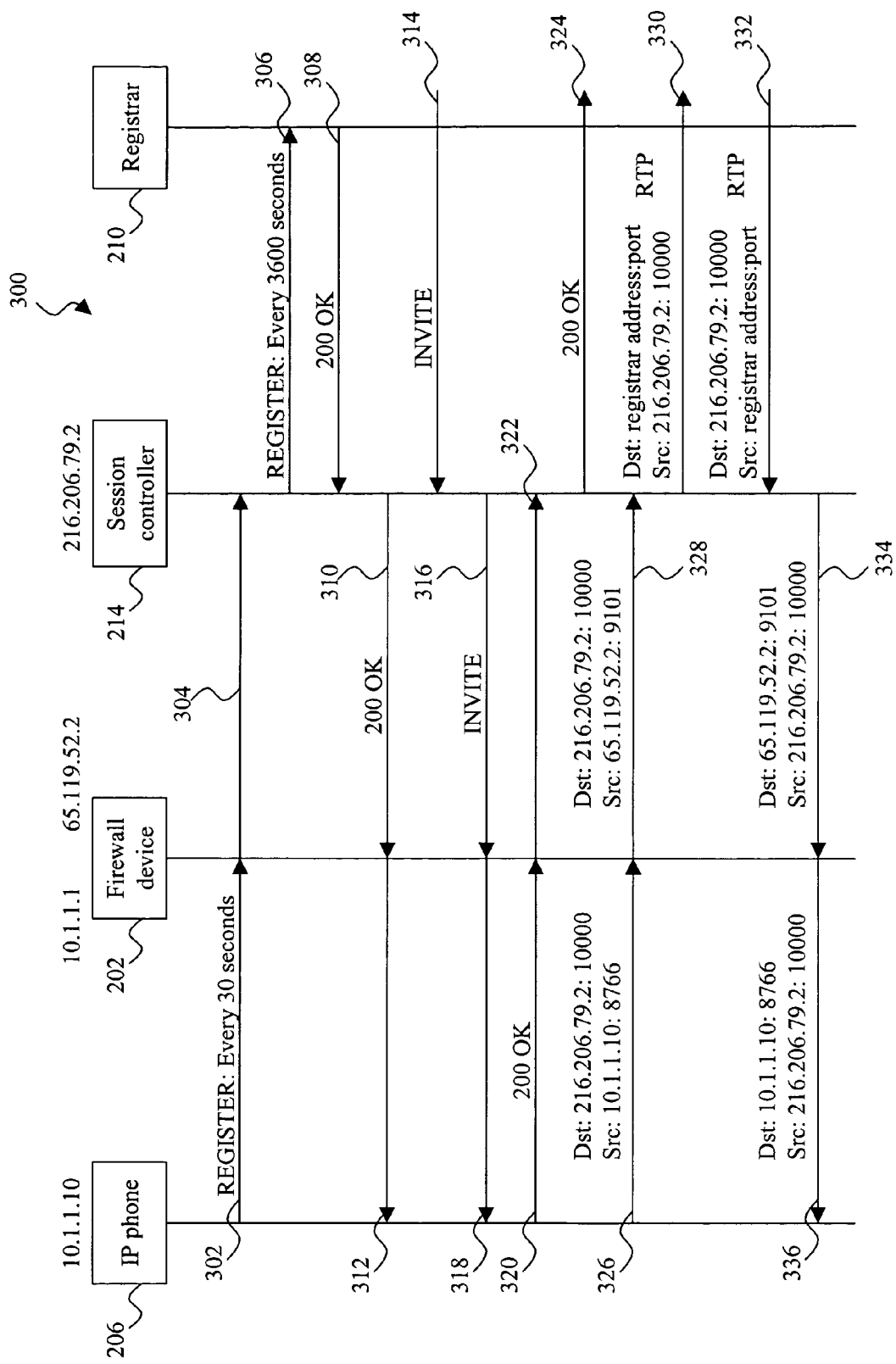
FIG. 3 is a sequence diagram of one embodiment of a data flow that may occur within the network architecture of FIG. 2.

With additional reference to FIG. 3, a sequence diagram 300 provides one embodiment of a call flow between various components of the network architecture 200 of FIG. 2. Prior to the sequence shown, it is understood that certain actions may occur. For example, the IP phone 206 may perform a boot sequence during initialization and the boot sequence may assign the IP phone its IP address and notify the IP phone of other information, such as the IP address of the session controller 214 for use as an outbound proxy.

The components involved in the call flow include the firewall device 202, IP phone 206, registrar 210, and session controller 214. For purposes of example, the sequence diagram 300 is illustrated using SIP, which relies on the session description protocol (SDP) for session description and RTP for transport. Accordingly, both a signaling channel and a media transport channel are used, with the IP phone 206 and session controller 214 each having one port assigned to the signaling channel and another port assigned to the media channel. For purposes of example, the IP phone 206 has an internal (e.g., within the private network) IP address of 10.1.1.10, a port 8766 assigned for media, and a port 5060 assigned for signaling. The firewall device 202 has an internal IP address of 10.1.1.1 (and associated ports) and an external (e.g., outside of the private network) IP address of 65.119.52.2, an external port 9101 (which will be assigned to a media channel in the present example), and another external port 9500 (for a signaling channel). It is understood that the port 9500 represents any port that may be assigned by the firewall device 202 to the signaling channel. The session controller 214 includes an IP address (accessible to the firewall device 202) of 216.206.79.2 with an internal port 10000 for media and an internal port 5060 for signaling, as well as an external port 10002 for media and an external port 5000 for signaling.

In step 302, the IP phone 206 sends a registration message (e.g., a SIP REGISTER message) to the session controller 214 via the firewall device 202. When sent by the IP phone 206 in step 302, the message includes the internal address of the IP phone as the source address and the address of the session controller 214 as the destination address (Dst: 216.206.79.2:5060; Src: 10.1.1.10:5060). The firewall device 202 receives the message from the IP phone 206, assigns a public IP address and port, and modifies the source information to that of the assigned public IP address and port before passing the message on to the session controller 214 (Dst: 216.206.79.2:5060; Src: 65.119.52.2:9500) in step 304.

Upon receiving the registration message, the session controller 206 learns the public IP address and port assigned by the firewall device 202, and forwards the message to the registrar 210 in step 306, using itself as the source address. After authentication (and any other activities), the registrar 210 responds to the session controller 214 with an acceptance message (e.g., a 200 OK message) in step 308. In steps 310 and 312, the acceptance message is returned to the IP phone 206 via the firewall device 202, with the destination addresses being modified as the message passes through the session controller 214 and firewall device 202. More specifically, the destination address is modified by the session controller 214 from the session controller's external signaling address/port (Dst: 216.206.79.2:5000) to the firewall device's external signaling address/port (Dst: 65.119.52.2:9500), and modified again by the firewall device 202 from the firewall device's external signaling address/port (Dst: 65.119.52.2:9500) to the IP phone's signaling address/port (Dst: 10.1.1.10:5060). The session controller 214 also changes the source address from that of the registrar 210 to that of the session controller (Src: registrar address:port to Src: 216.206.79.2:5060).

At this point in the sequence diagram 300, the registrar 210 is aware of the IP phone 206 (which has a current registration to an address and port on the session controller) using the established signaling channel and can direct a phone call from an external phone (e.g., the IP phone 212) to the IP phone 206. In the present example, both the firewall device 202 and the registrar 210 are configured to timeout after a certain period of time has elapsed. For purposes of illustration, if the firewall device 202 does not detect activity within thirty seconds, it will close the connection. However, the registrar is configured to timeout the IP phone's registration after not receiving a registration message or another renewal message within 3600 seconds. Accordingly, the firewall device 202 will timeout before the registrar 210, but using the firewall device's timeout period of thirty seconds may inundate the registrar with traffic, particularly if multiple devices are repeatedly registering based on the thirty second interval.

Although not shown in detail in FIG. 3, the session controller 214 may execute a method, such as the method 100 of FIG. 1, to control the timeout period used in messages sent to the IP phone 206 as follows. This may occur, for example, while repeating some or all of the steps 302-312 of FIG. 3.

Referring again to FIG. 1, in step 102, a registration message sent from the IP phone 206 to the registrar is intercepted before it is received by the registrar. In step 104, a determination is made as to whether it is time to renew the registration based on the 3600 second timeout period established by the registrar. For example, the session controller 214 may calculate whether it will receive another registration message from the IP phone 206 prior to the expiration of the 3600 seconds set by the registrar 210. If it is time to renew the registration, the method 100 continues to step 106 and forwards the registration message to the registrar. In steps 108 and 110, the registrar's response message to the registration request is received by the session controller 214 and the expiration time in the response message (e.g., an expiration field) is modified from the 3600 second timeout period defined by the registrar to a timeout period based on the thirty second timeout period defined by the firewall. For example, the modified timeout period may be equal to the firewall device's timeout period, or may be shorter than the firewall device's timeout period. In step 112, the modified message is forwarded to the IP phone via the firewall device 202. The IP phone 206 assumes that the registrar 210 wants the IP phone to renew its registration every thirty seconds and will send out registration requests accordingly.

Returning to step 104, if it is not time to renew the registration, the method continues to step 114 (and skips steps 306 and 308 of FIG. 3), where a substitute response message that includes the substitute thirty second timeout period is sent to the IP phone. In this case, although the registration message is not forwarded to the registrar, the IP phone assumes that the substitute response message is a valid message from the registrar. Accordingly, the session controller 214 may control the timeout period used by the IP phone 212 to prevent the firewall device 202 from timing out the connection, and may also minimize the number of registration messages received by the registrar 210. This enables the bindings between the IP phone 206 and the registrar 210 to be kept alive indefinitely.

Referring again to FIG. 3, an incoming call (e.g., an INVITE message) requesting the establishment of a media channel may be received by the session controller 214 in step 314 from an external source, such as the IP phone 212. The session controller forwards the message to firewall device 202 in step 316 (Dst: 65.119.52.2:9500; Src: 216.206.79.2:5060), and the message reaches the IP phone 206 in step 318 from the firewall device 202 (Dst: 10.1.1.10:5060; Src: 216.206.79.2:5060) via the address and port combinations established during registration for the signaling channel. A response message, such as a 200 OK message, may be returned from the IP phone 206 to the IP phone 212 in steps 320, 322, and 324. The firewall device 202 may then assign a port (e.g., port 9101) for the media channel, which is learned by the session controller 214 and used to maintain the established session. The IP phone 206 may then use the established media channel to send voice data via RTP as shown in steps 326, 328, and 330, and may receive voice data as shown in steps 332, 334, and 336.

Although not shown, upon receiving an end of call terminator (e.g., a BYE message), the session controller 214 may close the media channel. When the firewall device 202 times out, it will then close the pinhole. A new media channel may then be established if the IP phone sends out a request message (e.g., an INVITE) or another request message is received by the session controller 214. It is understood that the previously established signaling channel may remain open as described above.

In the present example, the IP phone call is established using symmetric RTP. This means that a dynamically assigned user datagram protocol (UDP) port and address is used to send outbound packets, and the outbound packets contain address information needed for inbound packets to locate the IP phone. Accordingly, the session controller 214 first learns the signaling channel information (e.g., address and port) and then learns the media channel information when a call is established. As the session controller 214 is aware of the public IP address and signaling port assigned to the IP phone 206 by the firewall device 202, it can forward incoming signal messages to the proper IP address and port. In addition, as the session controller 214 is aware of the public IP address and media port assigned to the IP phone 206 by the firewall device 202, it can forward incoming media messages to the proper IP address and port. Although the firewall device 202 may keep the signaling channel open indefinitely, the session controller 214 provides a layer of security by not publicizing the firewall's address or open ports (and instead sending the session controller's address/ports to the IP phone 212).

Figure 4:
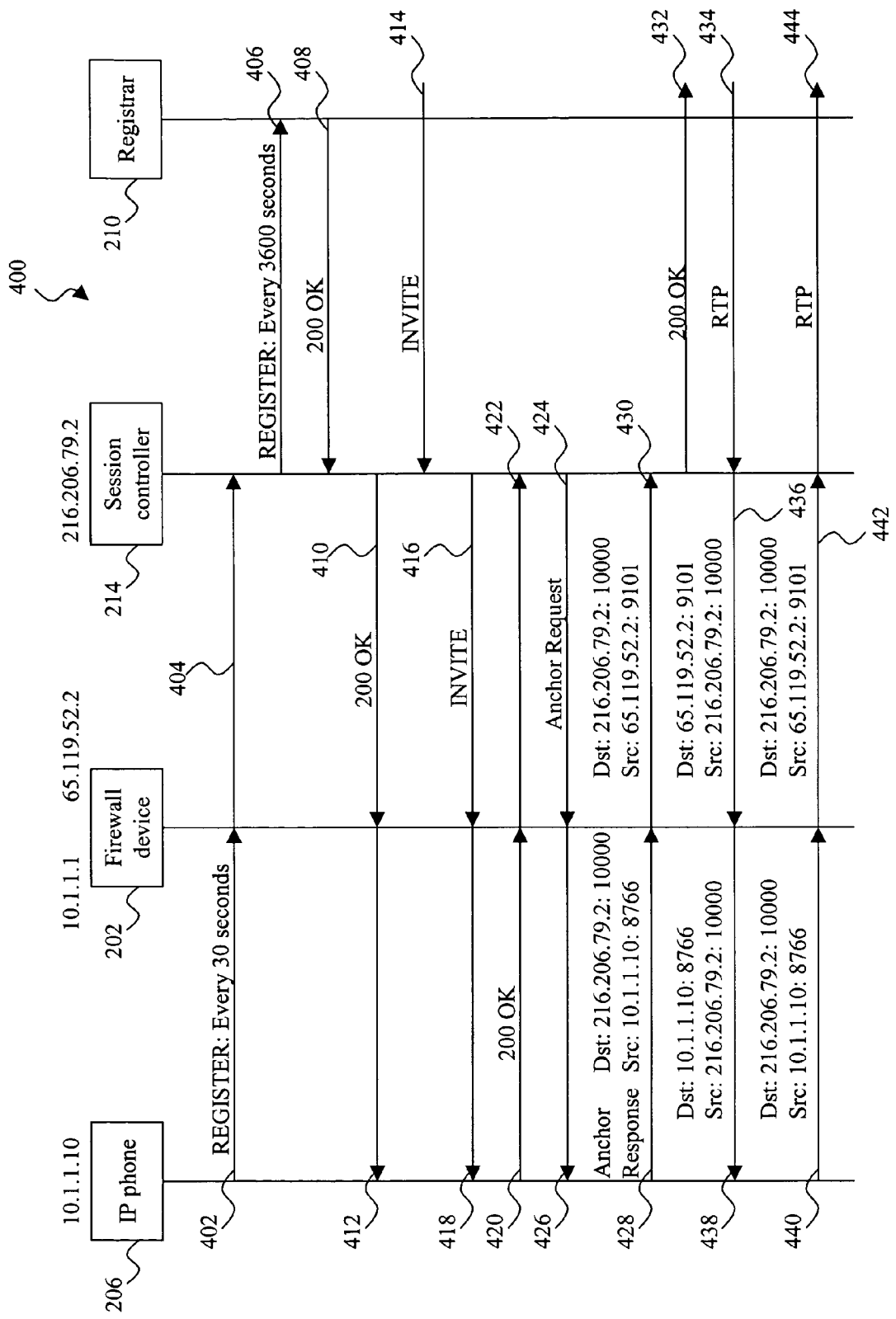
FIG. 4 is a sequence diagram of another embodiment of a data flow that may occur within the network architecture of FIG. 2.

Referring now to FIG. 4, a sequence diagram 400 provides another embodiment of a call flow between various components of the network architecture 200 of FIG. 2. Prior to the sequence shown, it is understood that certain actions may occur. For example, the IP phone 206 may perform a boot sequence during initialization and the boot sequence may assign the IP phone its IP address and inform the IP phone of other information, such as the IP address of the session controller 214. The present example may be used with asymmetric RTP (e.g., using different sending and receiving ports).

As in FIG. 3, the components include the firewall device 202, IP phone 206, registrar 210, and session controller 214. As previously described, both a signaling channel and a media transport channel are used, with the IP phone 206 and session controller 214 each having one port assigned to the signaling channel and another port assigned to the media channel. For purposes of example, the IP phone 206 has an internal (e.g., within the private network) IP address of 10.1.1.10, a port 8766 assigned for media, and a port 5060 assigned for signaling. The firewall device 202 has an internal IP address of 10.1.1.1 (and associated ports) and an external (e.g., outside of the private network) IP address of 65.119.52.2, an external port 9101 (which will be assigned to a media channel in the present example), and another external port 9500 (for a signaling channel). The session controller 214 includes an IP address (accessible to the firewall device 202) of 216.206.79.2 with an internal port 10000 for media and an internal port 5060 for signaling, as well as an external port 10002 for media and an external port 5000 for signaling.

In step 402, the IP phone 206 sends a registration message (e.g., a SIP REGISTER message) to the session controller 214 via the firewall device 202. When sent by the IP phone 206 in step 402, the message includes the internal address of the IP phone as the source address and the address of the session controller 214 as the destination address (Dst: 216.206.79.2:5060; Src: 10.1.1.10:5060). The firewall device 202 receives the message from the IP phone 206, assigns a public IP address and port, and modifies the source address to that of the assigned public IP address and port before passing the message on to the session controller 214 (Dst: 216.206.79.2:5060; Src: 65.119.52.2:9500) in step 404. Upon receiving the registration message, the session controller 214 learns the public IP address and port assigned by the firewall device 202, and forwards the message to the registrar 210 in step 406, using itself as the source address. After authentication (and any other activities), the registrar 210 responds to the session controller 214 with an acceptance message (e.g., a 200 OK message) in step 408. In steps 410 and 412, the acceptance message is returned to the IP phone 206 via the firewall device 202, with the destination addresses being modified as the message passes from the session controller 214 and firewall device 202. More specifically, the destination address is modified by the session controller 214 from the session controller's external signaling address/port (Dst: 216.206.79.2:5000) to the firewall device's external signaling address/port (Dst: 65.119.52.2:9500), and modified again by the firewall device 202 from the firewall device's external signaling address/port (Dst: 65.119.52.2:9500) to the IP phone's signaling address/port (Dst: 10.1.1.10:5060). The session controller 214 also changes the source address from that of the registrar 210 to that of the session controller (Src: registrar address:port to Src: 216.206.79.2:5060).

At this point in the sequence diagram 400, the registrar 210 is aware of the IP phone 206 (which has a current registration) and can direct a phone call from an external phone (e.g., the IP phone 212) to the session controller 214 on behalf of the IP phone 206. As described with respect to FIG. 3, the firewall device 202 and the registrar 210 are configured to timeout after a certain period of time has elapsed (e.g., 30 and 3600 seconds, respectively). Accordingly, a process such as the method 100 of FIG. 1 may be used as previously described to maintain the bindings between the IP phone 206 and the registrar 210.

An incoming call (e.g., an INVITE message) may be received by the session controller 214 from an external source, such as the IP phone 212, in step 414. The session controller forwards the message to firewall device 202 in step 416, and the message reaches the IP phone 206 in step 418. A response message, such as a 200 OK message, may be returned from the IP phone 206 to the session controller 214 in steps 420 and 422. However, instead of forwarding the 200 OK message to the IP phone 212, the session controller 214 sends an anchor request message to the IP phone 206 in steps 424 and 426. As is described in greater detail in previously incorporated U.S. patent application Ser. No. 10/657,813, the anchor request may be an encapsulated request sent over the signaling channel to open a communication channel from the private network side of the firewall device 202. Upon receipt of the anchor request, the IP phone 206 decapsulates the request and sends it back as an anchor response in steps 428 and 430. The request asks the firewall device 202 to open a media channel between the IP phone 206 and the session controller 214.

From the firewall's perspective, the request is received from the private side of the firewall device 202 (even though it was initiated by the session controller 214). Accordingly, the firewall device will assign a port for the media channel as though the request was actually initiated by the IP phone 206. In some embodiments, the IP phone 206 may need additional instructions (such as a software client) in order to handle the anchor request.

Once the anchor is established between the IP phone 206 and the session controller 214, the session controller forwards the 200 OK message (received in step 422) to the IP phone 212 in step 432. Because of the anchor, an RTP packet can be sent to the IP phone 206 (in steps 434, 436, and 438) asymmetrically without requiring the IP phone 206 to send the first RTP packet. In steps 440, 442, and 444, respectively, an RTP packet sent by the IP phone 206 is sent to the firewall device 202, session controller 214, and IP phone 212.

In another embodiment, a SIP NOTIFY request may be used to keep a channel alive (rather than the REGISTER message used in FIGS. 3 and 4). For example, the session controller 214 (FIG. 2) may receive a REGISTER request from the IP phone 206 via the firewall device 202. As previously described, the session controller 214 will learn the firewall device's binding for the signaling channel established over UDP. The session controller 214 then sends the NOTIFY request to the IP phone 206 via the address/port learned during the REGISTER request. The NOTIFY request will be sent after a predefined period of time elapses (e.g., a period of time less than the timeout period of the firewall device 202) and the IP phone 206 will respond to the NOTIFY request with a "200 OK" response. As opposed to the previously described method that relied on REGISTER messages, the current method does not require the IP phone 206 to repeatedly REGISTER in order to prevent the firewall device 202 from timing out the signaling channel. Instead, the session controller 214 takes an active role in keeping the signaling channel alive by generating each NOTIFY request and sending it to the IP phone 206.

In another embodiment, discovery of the timeout period (e.g., a binding lifetime) of the firewall device 202 may be achieved as follows using a device such as the TA 208 connected to the analog phone 207. The TA may send a register request to the session controller 214, which learns the firewall device's address/port from the request, and then waits for a predefined period of time (T seconds). After the period expires, the TA sends a binding request (e.g., a SIP OPTIONS message) to the session controller 214 from a different socket (e.g., address and/or port). The session controller 214 is configured to send a response to the binding request back to the address learned from the original register request. If the TA receives the response on a particular port (e.g., port 5060), then the binding lifetime is set equal to T seconds. If no response is received, then the timeout has already occurred and T is reduced (e.g., T=T−5) before starting over and sending another registration request. If T is reduced until it equals a predefined minimum (e.g., T=10 seconds), then the process may be stopped.

In still another embodiment, a device such as the TA 208 may handle voice activation detection (VAD) and silence suppression as follows to prevent a connection from being terminated due to lack of traffic (e.g., if someone is listening to a conference call but not speaking). The TA may send a synthetic periodic packet (e.g., an RTP or RTCP packet) over an RTP/RTCP channel based on the previously described binding discovery lifetime of the firewall device 202. Upon receiving the packet, the session controller 214 would filter the packet based on, for example, a proprietary string in the packet. This enables the connection to stay alive without letting unnecessary packets past the session controller 214.

In yet another embodiment, a service provider or other external user outside the private network delineated by the firewall device 202 may perform monitoring, reconfiguration, upgrades, quality of service checking, and similar functions within the private network. Although the firewall device would generally reject packets originating from the public network 204, the existing communication channel established between the IP phone 206 and session controller 214 enables the service provider to utilize the session controller for externally originated requests.

For example, status and alarm information may be sent using a supporting protocol such as the simple network management protocol (SNMP). A SNMP message may be encapsulated in a SIP message body and sent to the IP phone 206 or TA 208 using the existing call channel between the IP phone 206/TA 208 and the session controller 214. Note that endpoint identifiers (e.g., a TA serial number and/or a media access control (MAC) address) may be used to verify that the equipment being queried is the correct equipment.

In another embodiment, the present disclosure may provide an external user such as a service provider with ping capability of a device in the private network. In this embodiment, the existing communication channel between the session controller 214 and one or more of the devices 206, 208, and 209 may be used to receive and transmit ping requests. The ping requests may be encapsulated, for example, in SIP messages.

In still another embodiment, the present disclosure may provide quality of service (QoS) functionality. For example, to measure a round trip delay in an existing connection, an RTCP packet may be sent via an established RTCP channel as follows. A QoS packet may be time stamped and sent over the RTCP channel. The endpoint (e.g., one of the devices 206, 208, 209) may receive the packet and forward it back to the session controller 214, which calculates the delay based on the difference between the time the packet was received and the timestamp value included in the packet. Additional QoS functions include the detection of out of sync packets using sequence numbers, and the recordation of minimum, maximum, and average inter-arrival times for inclusion in a session detail record (SDR). Such QoS functionality may be selectively applied to connections.

It is understood that the various functions described above may be scaled, filtered, or adjusted using predefined or dynamically calculated thresholds. For example, alarms provided by SNMP may be used to monitor large numbers of users and devices, with alarms being filtered as desired. Furthermore, various QoS parameters may be compared to thresholds, with alarms occurring if the parameters indicate that a certain loss of QoS is occurring.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

We claim:

1. A method for traversing a firewall device to maintain a registration between a first device and a second device separated by the firewall device, the method comprising:
   intercepting a registration message from the first device to the second device; determining, after intercepting the registration message, whether it is time to renew the first device's registration by determining whether another registration message from the first device will be intercepted prior to an expiration of a first timeout period defined by the second device;
   forwarding the registration message to the second device if it is time to renew the first device's registration;
   sending a substitute response to the first device without forwarding the registration message to the second device if it is not time to renew the first device's registration, wherein the substitute response includes the second timeout period;
   intercepting a response message from the second device to the first device, wherein the response message includes the first timeout period; and
   replacing the first timeout period in the intercepted response message with a second timeout period based on a binding lifetime of the firewall device before forwarding the response message to the first device.

2. The method of claim 1 further comprising modifying a source address of the registration message before forwarding the registration message to the second device.

3. The method of claim 2 further comprising modifying a destination address of the response message prior to forwarding the response message to the first device.

4. The method of claim 1 further comprising establishing an anchor between the first device and a third device positioned between the firewall device and the second device, wherein the anchor forms a communication channel for the first and third devices through the firewall device.

5. The method of claim 4 wherein establishing an anchor comprises:
   sending an encapsulated request message from the third device to the first device;
   decapsulating the request message by the first device; and
   sending the decapsulated request message to the third device via the firewall device, wherein the firewall device opens a channel based on the request message from the first device.

6. The method of claim 1 further comprising discovering the second timeout period, wherein the discovering includes:

sending a register request from a first socket associated with the first device to a third device positioned between the firewall device and the second device;

waiting for a predefined period of time;

sending a binding request to the third device from a second socket associated with the first device after the predefined period of time expires; and if a response is received on the first socket, setting the second timeout period to the predefined period of time.

7. The method of claim 6 further comprising reducing the predefined period of time if no response is received and sending a new register request from the first socket to the third device.

8. The method of claim 1 further comprising sending ping requests to the first device from a third device positioned between the firewall device and the second device.

9. The method of claim 1 further comprising determining a packet delay by sending a time stamped packet to the first device from a third device positioned between the firewall device and the second device, and calculating the packet delay as a difference between the timestamp and the time the packet is received back at the third device from the first device.

10. The method of claim 1 further comprising obtaining status and alarm information from the first device by sending messages to the first device from a third device positioned between the firewall device and the second device.

11. The method of claim 1 further comprising:

periodically sending a synthetic packet from the first device to a third device positioned between the firewall device and the second device; and filtering the synthetic packet by the third device to prevent the packet from reaching the second device, wherein the synthetic packet prevents an active channel from being terminated due to lack of outbound traffic.

12. A system providing for firewall traversal, the system comprising:

a first device positioned in a private network;

a firewall device accessible to the private network and a public network;

a second device in the public network configured to register the first device; and a session controller positioned in the public network between the firewall device and the second device, the session controller comprising a plurality of software executable instructions including:

instructions for intercepting a registration message from the first device to the second device;

instructions for determining, after intercepting the registration message, whether to renew the first device's registration by determining whether another registration message from the first device will be intercepted prior to an expiration of a first timeout period defined by the second device;

instructions for forwarding the registration message to the second device if it is time to renew the first device's registration;

instructions for sending a substitute response to the first device without forwarding the registration message to the second device if it is not time to renew the first device's registration, wherein the substitute response includes the second timeout period;

instructions for intercepting a registration response message from the second device to the first device, wherein the response message includes the first timeout period defined by the second device; and instructions for replacing the first timeout period in the response message with the second timeout period before forwarding the response message to the first device.

13. The system of claim 12 wherein the session controller further comprises: instructions for learning a first port of the firewall device that has been assigned to a signaling channel established between the first device and the session controller, wherein the first port is learned from the registration message sent from the first device to the second device; and instructions for learning a second port of the firewall device that has been assigned to a transport channel established between the first device and the session controller.

14. The system of claim 12 wherein the first device is an IP telephone.

15. The system of claim 12 wherein the first device is an analog telephone adapter.

16. The system of claim 12 wherein the registration message is a session initiation protocol (SIP) REGISTER message.

17. An apparatus for enabling a network edge device to maintain a registration between a first device and a second device separated by the edge device, the apparatus comprising:

an interface accessible to the edge device and the second device; and means for intercepting a registration message from the first device to the second device;

means for determining, after intercepting the registration message, whether it is time to renew the first device's registration by determining whether another registration message from the first device will be intercepted prior to an expiration of a first timeout period defined by the second device;

means for forwarding the registration message to the second device if it is time to renew the first device's registration;

means for sending a substitute response to the first device without forwarding the registration message to the second device if it is not time to renew the first device's registration, wherein the substitute response includes the second timeout period;

means for intercepting a response message from the second device to the first device, wherein the response message includes the first timeout period; and means for replacing the first timeout period in the response message with a second timeout period based on a binding lifetime of the edge device before forwarding the response message to the first device.

18. The apparatus of claim 17 further comprising means for establishing an anchor between the first device and a third device positioned between the edge device and the second device, wherein the anchor forms a communication channel for the first and third devices through the edge device.

* * * * *